United States Patent
Van Veenendaal et al.

(10) Patent No.: US 8,077,283 B2
(45) Date of Patent: Dec. 13, 2011

(54) DISPLAY WITH REDUCED MOIRE EFFECT

(75) Inventors: Erik Van Veenendaal, Eindhoven (NL); Hjalmar Edzer Ayco Huitema, Veldhoven (NL); Bas Jan Emile Van Rens, Heemstede (NL)

(73) Assignee: Creator Technology B.V., Breda (NL)

( * ) Notice: Subject to any disclaimer, the term of this patent is extended or adjusted under 35 U.S.C. 154(b) by 650 days.

(21) Appl. No.: 11/721,275

(22) PCT Filed: Dec. 7, 2005

(86) PCT No.: PCT/IB2005/054104
§ 371 (c)(1),
(2), (4) Date: Dec. 2, 2008

(87) PCT Pub. No.: WO2006/061786
PCT Pub. Date: Jun. 15, 2006

(65) Prior Publication Data
US 2010/0277446 A1    Nov. 4, 2010

(51) Int. Cl.
*G02B 6/00*    (2006.01)
(52) U.S. Cl. ...................................................... 349/143
(58) Field of Classification Search .................... 349/146
See application file for complete search history.

(56) References Cited

U.S. PATENT DOCUMENTS

| | | | |
|---|---|---|---|
| 6,788,452 B2 | 9/2004 | Liang et al. | |
| 7,697,101 B2* | 4/2010 | Hong | 349/146 |
| 2001/0001566 A1* | 5/2001 | Moseley et al. | 349/15 |
| 2002/0154257 A1 | 10/2002 | Iijimja | |
| 2003/0174385 A1 | 9/2003 | Liang et al. | |
| 2003/0184665 A1 | 10/2003 | Berstis | |
| 2004/0169913 A1 | 9/2004 | Chen et al. | |

FOREIGN PATENT DOCUMENTS

JP    2003-195296 A    7/2003

OTHER PUBLICATIONS

International Search Report for PCT/IB2005/054104 dated Mar. 20, 2006.

* cited by examiner

*Primary Examiner* — Sung Pak

(57) ABSTRACT

A display has reduced moire interference. The display has a backplane with a regular array of pixels and a frontplane with a regular array of cells. The backplane and frontplane are laminated together. The width of the distribution of aperture (the total inner cell area above an active pixel area divided by total pixel area) over the display is reduced. Sinusoidally curved walls or other curved pixel edges may be used in the frontplane or backplane to control the distribution.

17 Claims, 10 Drawing Sheets

DISPLAY WITH REDUCED MOIRE EFFECT

The invention relates to electronic display devices, in particular to a display made from a frontplane and a backplane in which moiré effects are reduced or eliminated.

Displays are often assembled from a backplane which includes an array of pixel electrodes and conductors to drive electronics and a frontplane on which electro-optic cells of the display are located. Electrophoretic active-matrix displays, for example, may have an active-matrix backplane and an electrophoretic frontplane. The frontplane need not be electrophoretic. A frontplane may have electrowetting or liquid crystal display elements or another type of opto-electronic pixel element positioned with respect to electronics arrayed on a backplane. Displays of this kind are known from, for example, published application US2004/0219306A of Xiaojia Wang et al., which is incorporated herein by reference. One of the final processing steps in manufacture of this kind of display can be making the cells of the display by lamination or other assembly of front- and backplane.

The active pixel area is the area of the backplane pixel available for the display itself and does not include areas of the pixel which do not change their optical or electrical state during operation of the display. Examples of areas that are not included in the active pixel area are pixel row and column electrodes and thin film transistors (TFTs). Each display element of the display thus has an aperture which can be quantified as, for example, the total inner cell area on the frontplane above the active pixel area divided by the entire area of that corresponding pixel on the backplane (the total pixel area).

Moiré effects are interference patterns of light or other radiation that occur when sets or patterns of lines, dots or other repeating features are superimposed on each other. The aperture of display elements in an array on a display screen may be such a repeating pattern. The display formed by laminating a backplane to a frontplane is typically a regular array of, generally speaking, square pixels. If an electrophoretic or other type of foil that is part of the frontplane is also a regular array of individual cells, such as a microcell or a square microcup structure, then the lamination of front- and backplane may give rise to moiré effects.

Several methods have been disclosed for reducing the moiré effects in displays. These moiré effects are from various causes. For example, published applications US 2003/0132895 and no. US 2003/0184665 of Viktors Berstis disclose using non-uniformly spaced pixels to avoid moiré effects between display elements such as LCDs, LEDs or TFTs and features of an image being displayed or being detected by a sensor array. U.S. Pat. No. 6,075,581 discloses an optical filter for reducing moiré effects in an LCD or other display having a matrix-like pixel pattern. Published application no. WO2004/051354 of Rong-Chang Liang et al. discloses an electrophoretic display with a two layer structure in which laminating a top microcup layer to a bottom layer at an angle or a less symmetrical microcup array is used to avoid formation of undesirable moiré patterns.

Currently available solutions do not address or do not adequately address moiré effects from the distribution of aperture over the display. Hence, there is a need to reduce moiré effects caused by those differences in geometry in displays in which a frontplane and backplane are laminated together.

Accordingly, an object of the present invention is to overcome disadvantages of the prior art such as by reducing moiré effects in displays of this kind. For this purpose, a display is designed and manufactured in which, for example, the size of or the width of the distribution of aperture over the display surface is controlled.

Applicants' research has shown that moiré effects are often primarily caused by a distribution of aperture over the display. If the width of the distribution of the aperture is reduced, the moiré effects are reduced as well.

To accomplish this and other objects, in one embodiment of the present invention, moiré effects are reduced by a structure of curved walls dividing cells in the frontplane, instead of straight walls.

In other embodiments the frontplane cell walls may have jagged edges, for example in a saw tooth pattern, or may be curved containing one or more corners.

In another embodiment of the present invention, a frontplane with a square array of cells may be combined with a backplane having a pixel array in which pixels have curved pixel edges.

In other embodiments the backplane cell walls may have jagged edges, for example in a saw tooth pattern, or may be curved containing one or more corners.

Other measures can be taken to vary aperture, for example, by varying the active pixel area or by varying the total pixel area from display element to display element or by other variations in shape from frontplane cell to cell.

These and other aspects of the invention will be apparent from and elucidated with reference to the embodiment(s) described hereinafter.

Figure 2A:
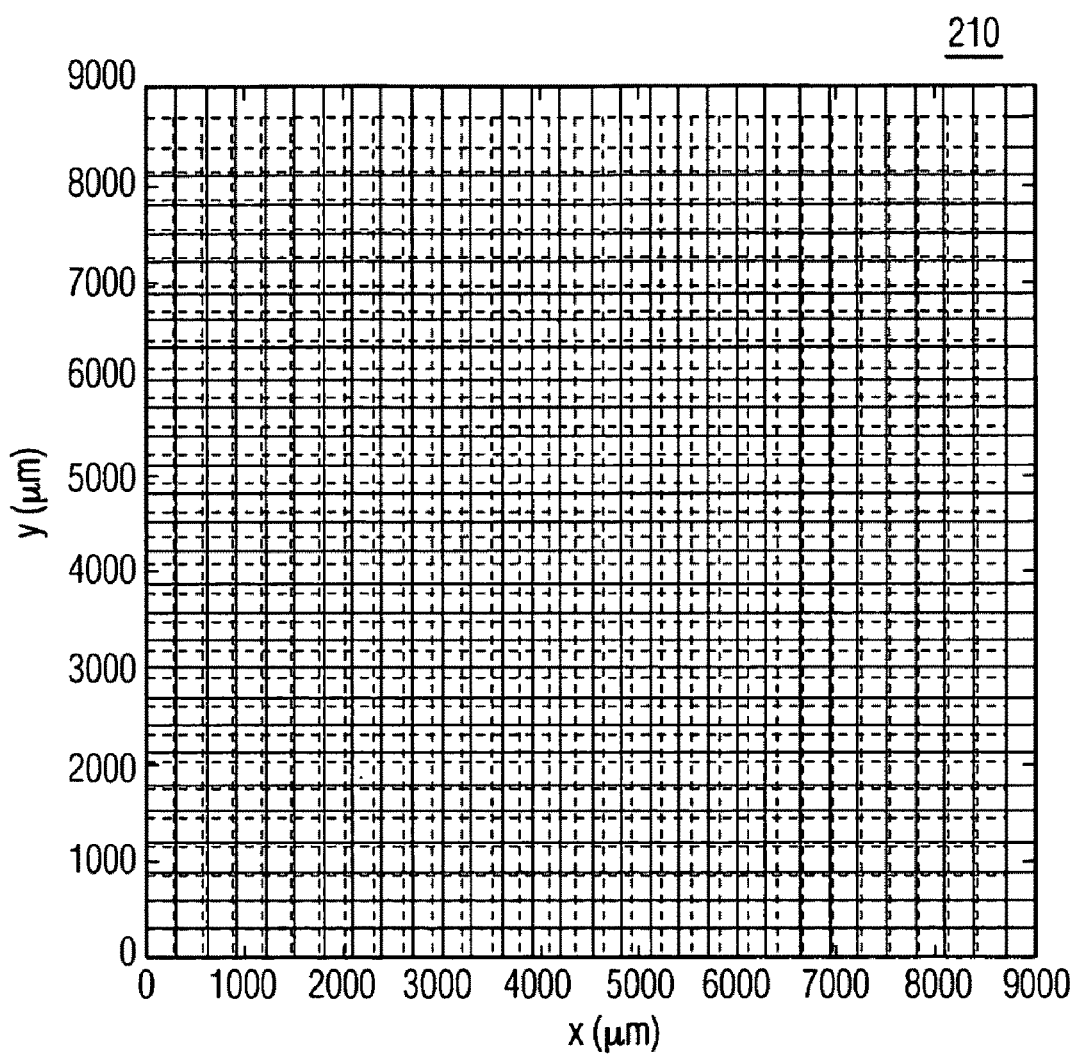
FIG. 2a is an overview of cells in a frontplane with a square pixel structure superimposed on a backplane with a square pixel structure.
Figure 3A:
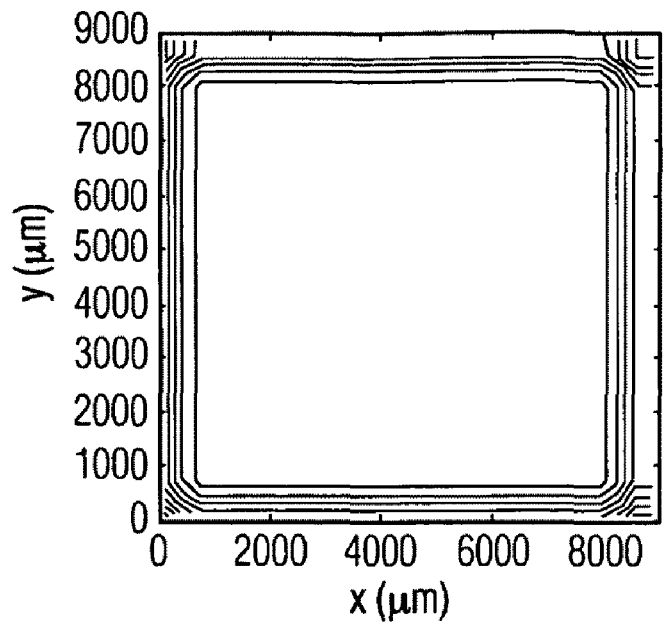

FIGS. 3a and b illustrate an aperture distribution in a display with a frontplane as shown in FIG. 2a.

Figure 4A:
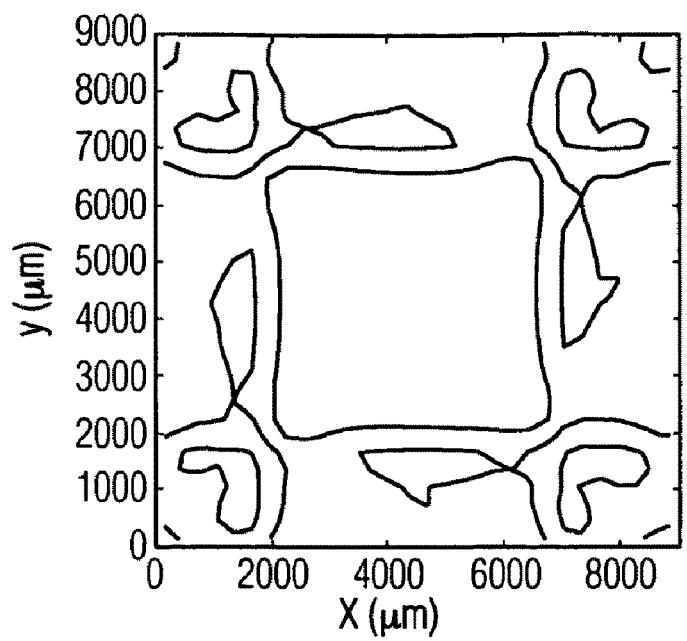
Figure 4B:
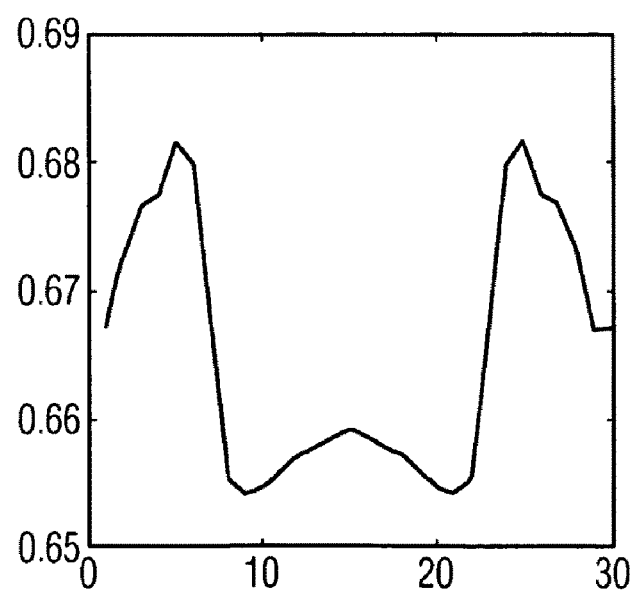

FIGS. 4a and b illustrate an aperture distribution in a display with a structure with curved walls.

Figure 5A:
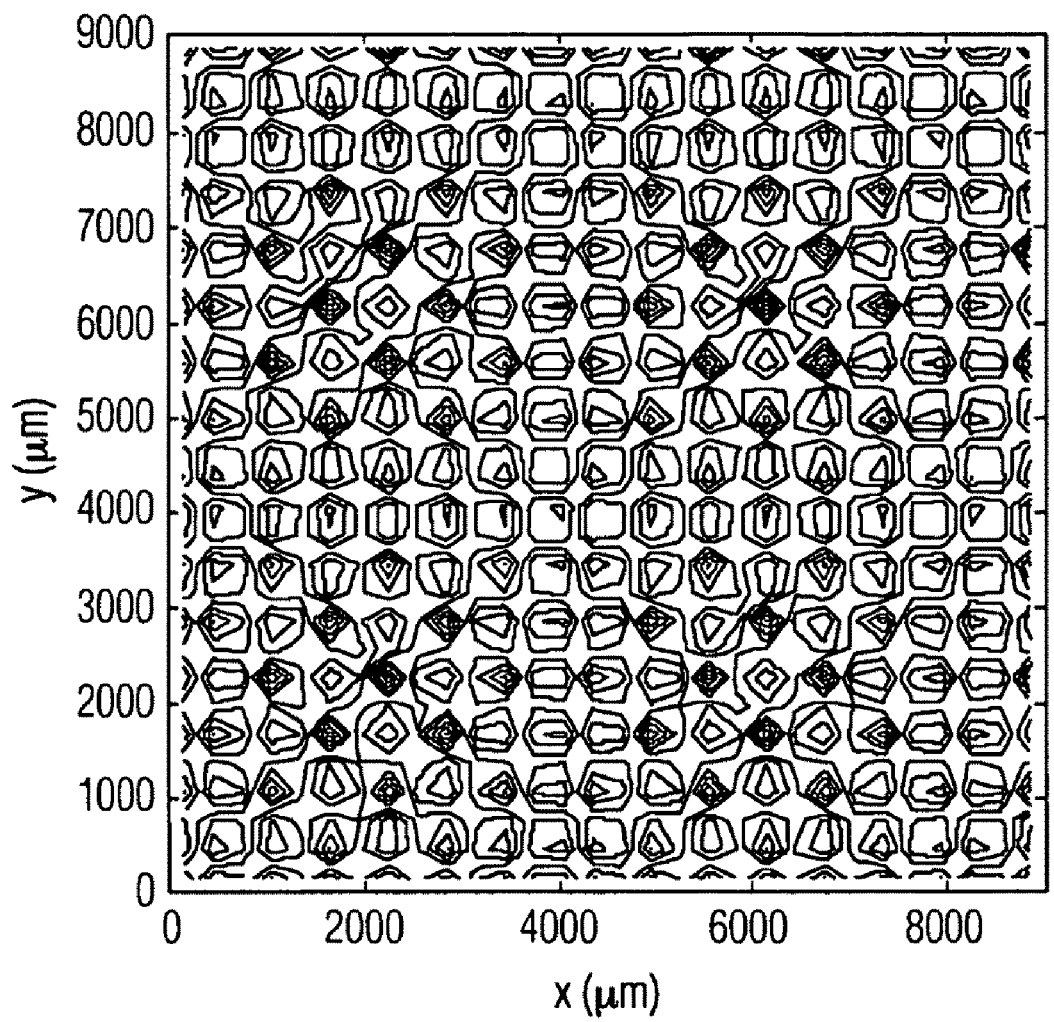
Figure 5B:
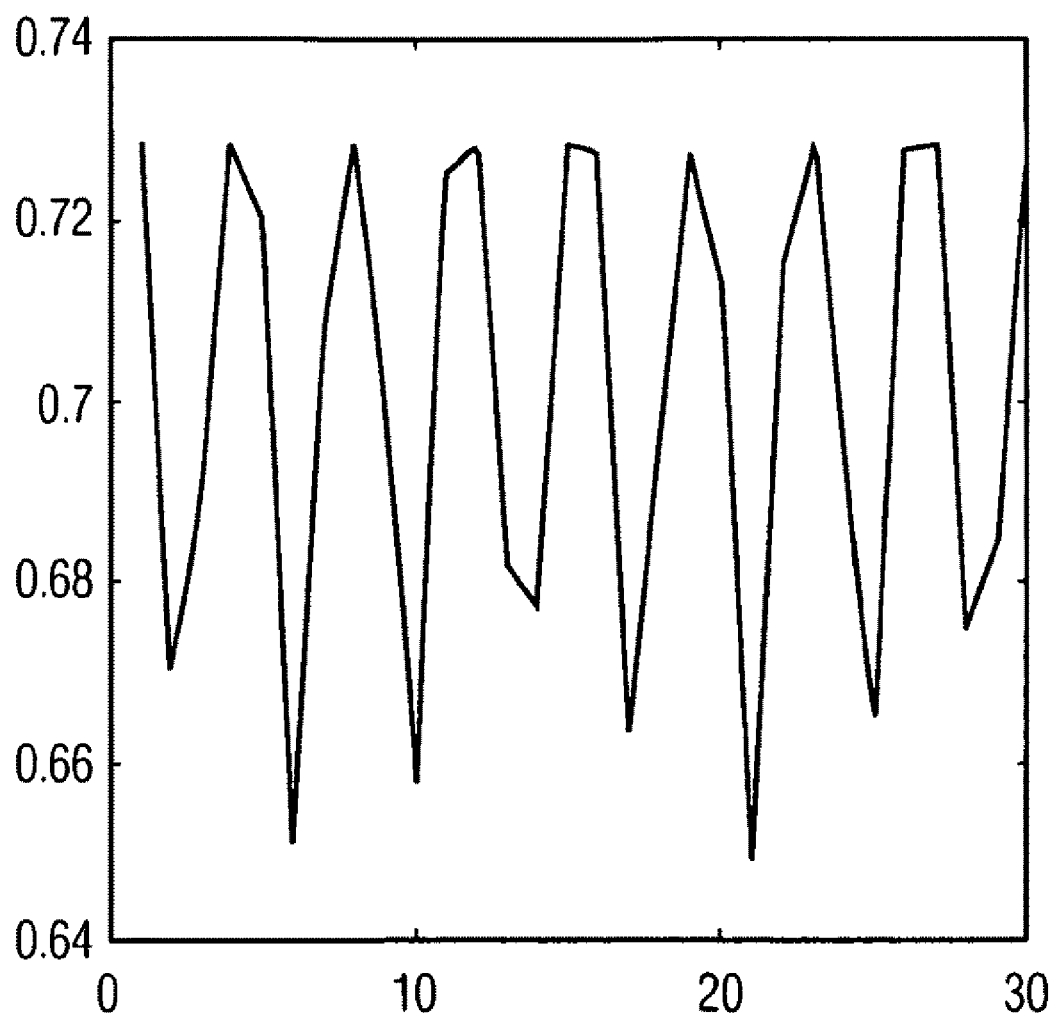

FIGS. 5a and b illustrate an aperture distribution in a display with straight pixel walls in the front- and backplanes, which are at an angle to each other.

Figure 6A:
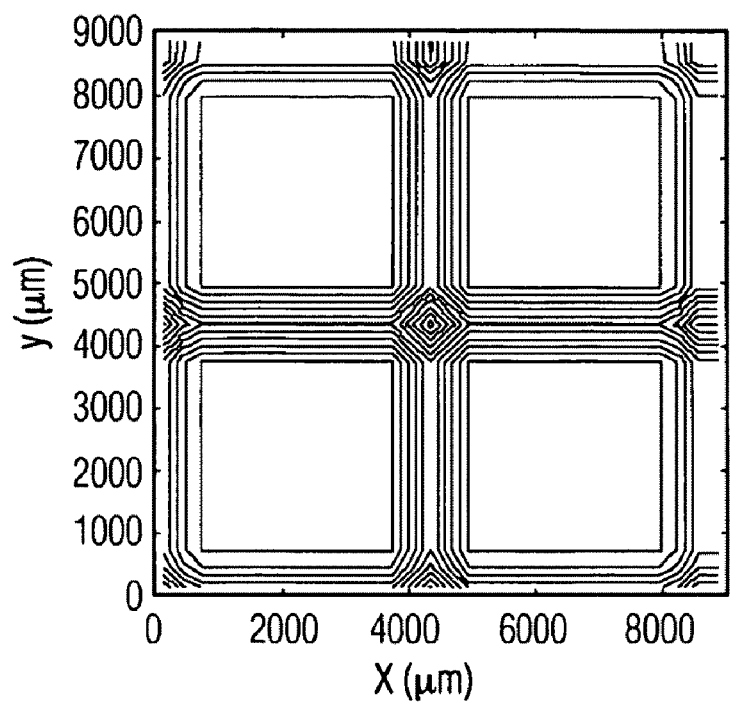
Figure 6B:
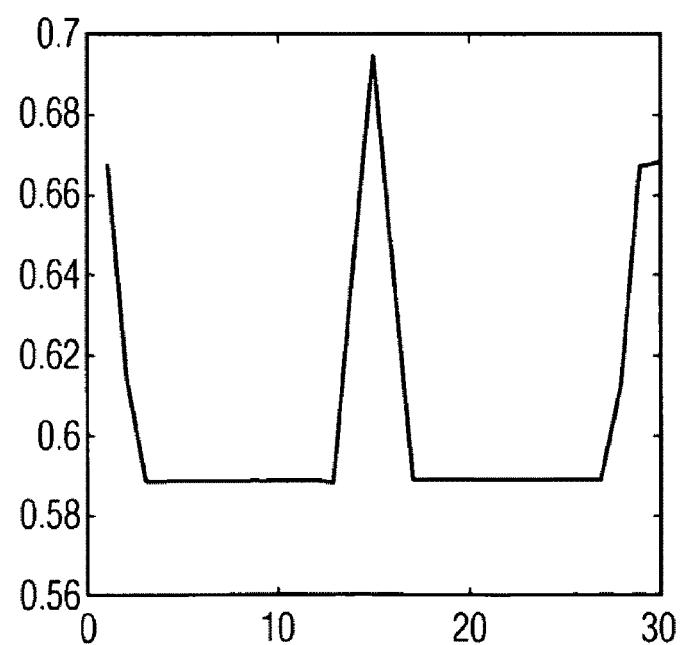

FIGS. 6a and b illustrate an aperture distribution for a display in which pixels have straight walls and each frontplane pixel has four cells.

Figure 7A:
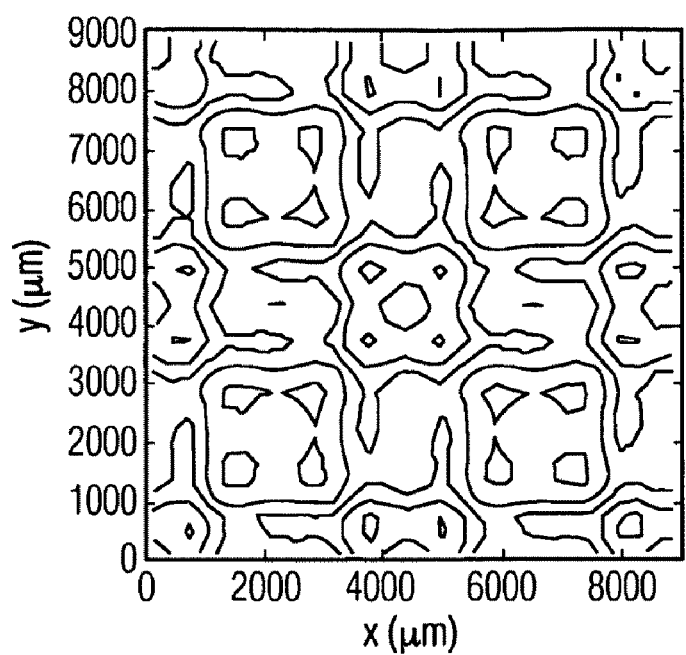
Figure 7B:
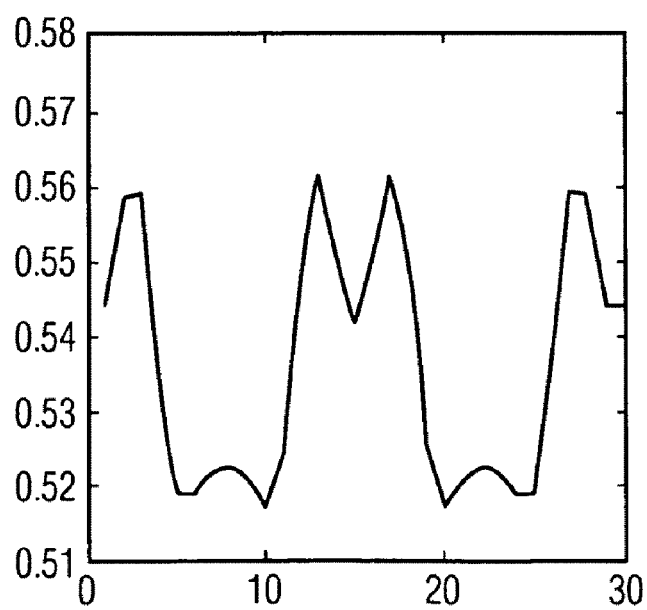

FIGS. 7a and b illustrate an aperture distribution in which frontplane cells have curved walls and each frontplane pixel has four cells.

Figure 1A:
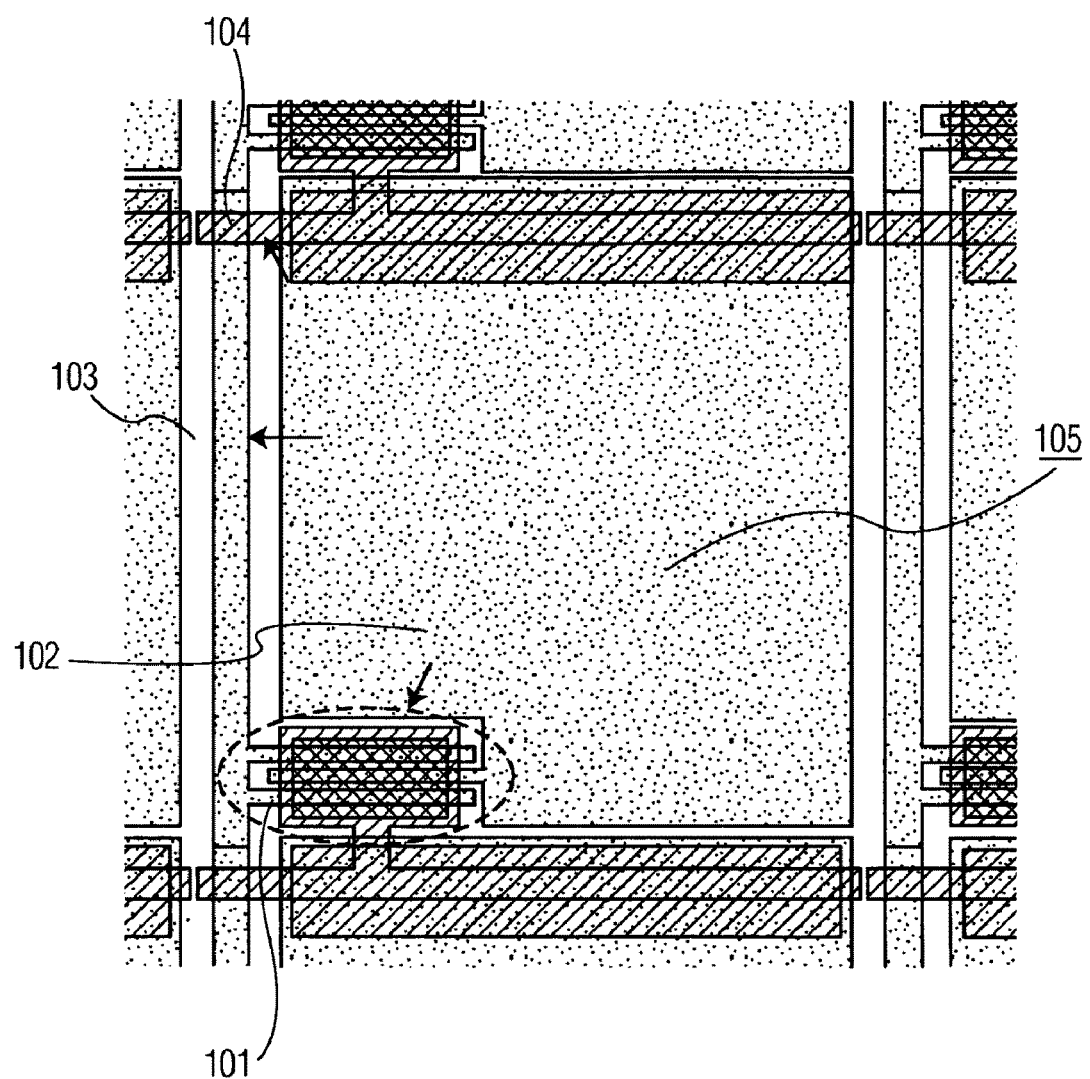
FIG. 1a shows a pixel layout in an active-matrix backplane.

FIG. 1a is an overview of a backplane pixel 105 in an active-matrix backplane. The pixel pad 102 makes up the active pixel area. A TFT area 101, column electrode area 103 and row electrode area 104 also occupy space on the backplane cell 105. In a two-metal layer design, in particular, for an active-matrix backplane the active pixel area is less than the total pixel area, as the rows, columns and pixel TFTs require some area.

Figure 1B:
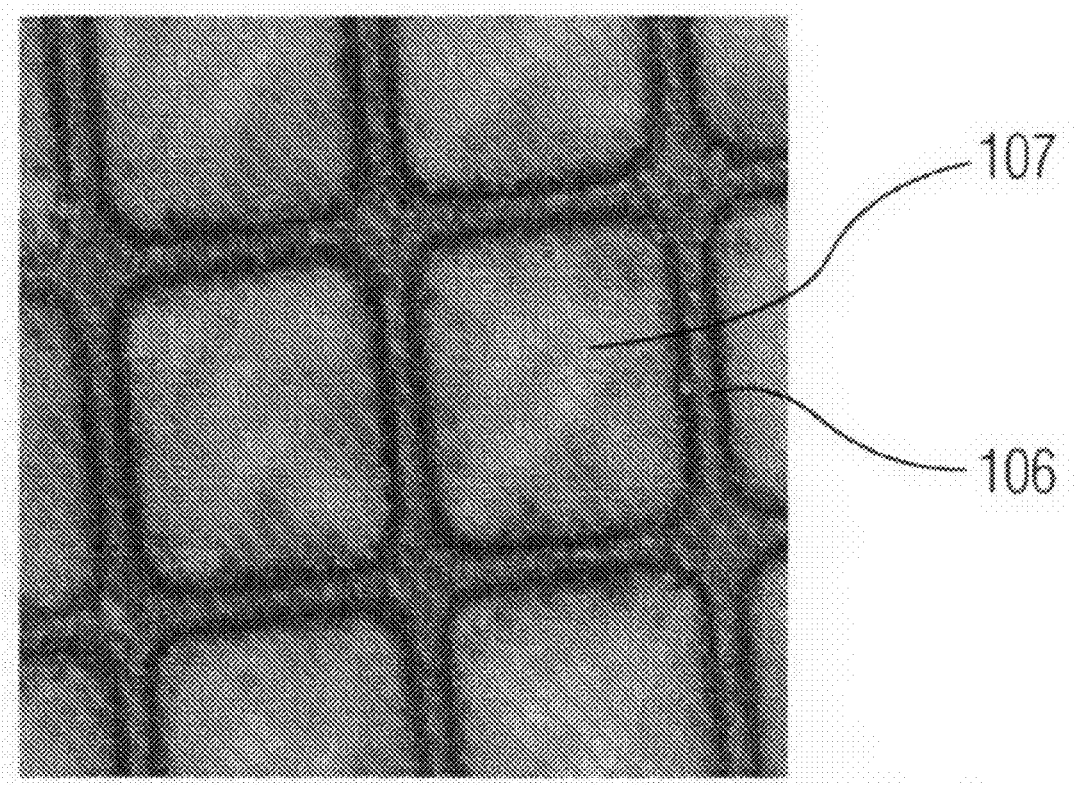
FIG. 1b shows a typical electrophoretic cell structure in an active-matrix frontplane.

FIG. 1b shows an electrophoretic frontplane pixel cell 106 with a microcup structure having a total pixel area 107.

FIG. 2a,b illustrates a geometry in which straight walls are replaced by curved walls. Moiré effects are reduced by introducing curved walls to produce a more uniform aperture. The reduction in moiré effect can be seen from FIGS. 2a and 2b.

In FIG. 2a an area of 30×30 cells in a frontplane 210 (cell size 290×290 $\mu m^2$) and 30×30 pixels in a backplane (pixel size 300×300 μm², behind 210 in FIG. 2*a*) and are overlaid. Here, the active pixel area corresponds to a square area within the total pixel. The active pixel area is an area of 270×270 μm² in the center of the 300×300 μm² backplane pixel. The cells in the frontplane are divided by walls of a certain thickness. In the embodiments discussed below the wall thickness is set to 20 μm.

Figure 2B:
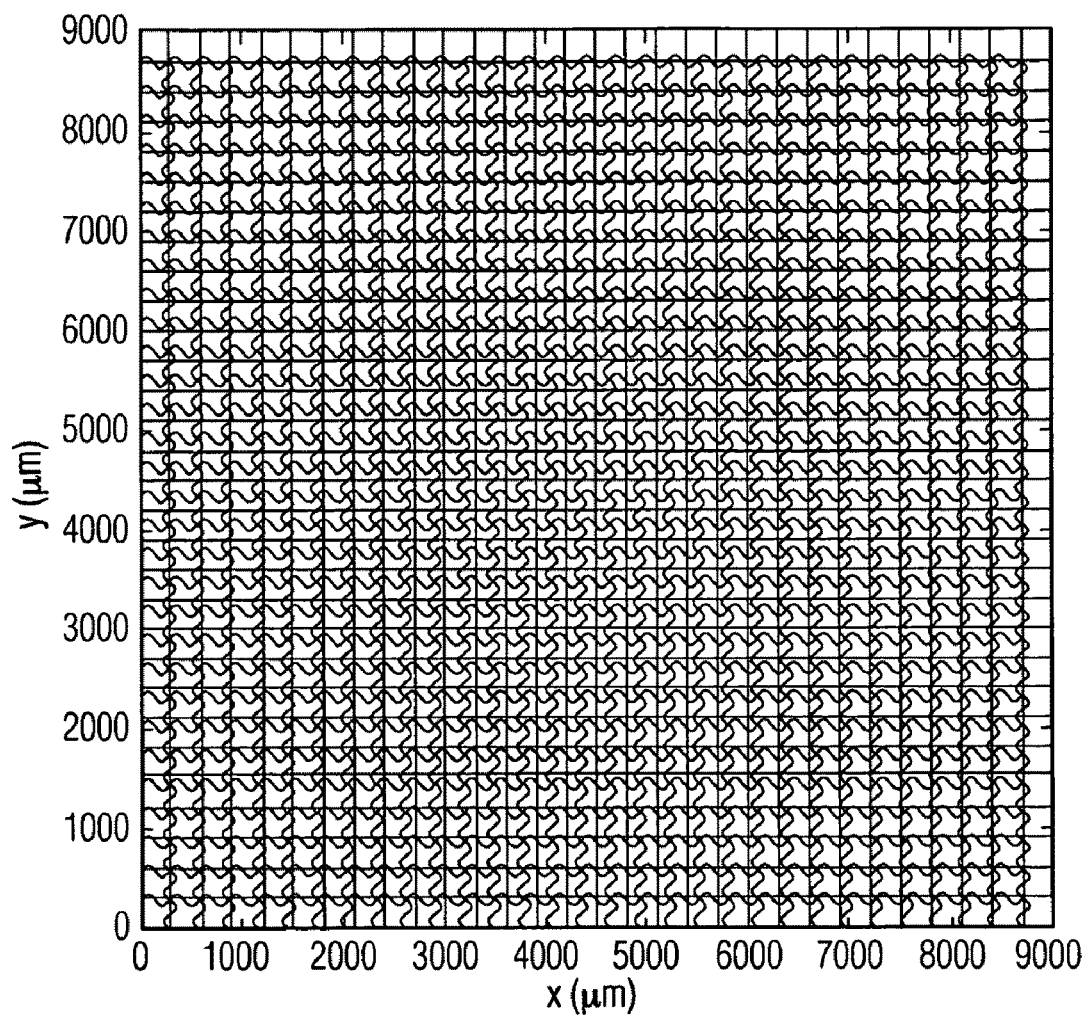
FIG. 2b is an overview of cells in a frontplane with a pixel structure with sinusoidally curved walls superimposed on a backplane with a square pixel structure.

The geometry in FIG. 2*b* is the same as in FIG. 2*a*, except that the cells in the frontplane 210' are curved sinusoidally, with the sine wave having an amplitude of 60 μm. The x-axis and y-axis in FIGS. 2*a* and 2*b* are dimensions of the pixels in μm.

Figure 3B:
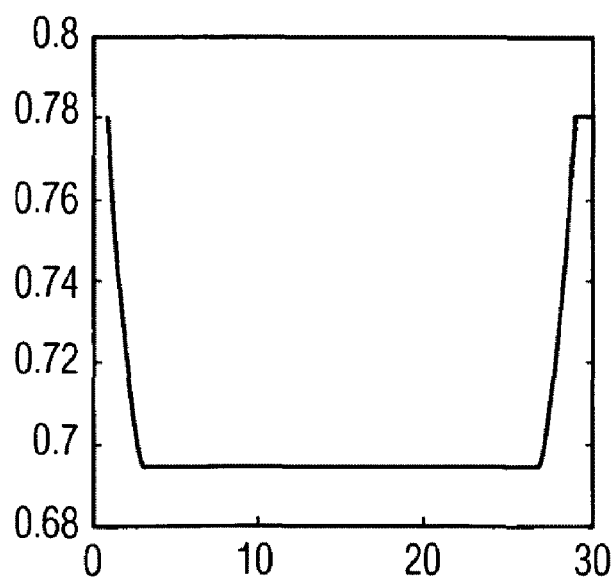

FIGS. 3*a* and *b* show an aperture distribution for an area of 30×30 pixels, covered with a frontplane. The size of each pixel is 300×300 μm². The active pixel size is 270×270 μm². The cells have straight walls of 20 μm thickness. The cell size is 290×290 μm². The backplane and frontplane rows are aligned (i.e. mismatch angle 0°). FIG. 3*a* is a plot of lines (iso-aperture lines) joining points at which pixels have the same value of aperture at intervals of 0.01. FIG. 3*b* is a plot of pixel number (on the x-axis) along a diagonal across the pixel area against the value of the aperture for that pixel (on the y-axis).

FIGS. 4*a* and *b* show an aperture distribution for an area of 30×30 pixels, covered with a frontplane. The pixel size 300×300 μm². The active pixel size is 270×270 μm². The cell size is 290×290 μm². The cells have sinusoidally curved walls of 20 μm thickness with the amplitude of the sine curve being 60 μm, and a mismatch angle of 0°. The division between iso-aperture lines is also 0.01.

FIGS. 5*a* and *b* show an aperture distribution for an area of 30×30 pixels, covered with a frontplane. The pixel size 300×300 μm², and the active pixel size is 270×270 μm², with a cell size of 290×290 μm². The cells have straight walls of 20 μm thickness, and a mismatch angle of 45°. The division between iso-aperture lines is 0.01.

FIGS. 6*a* and *b* show an aperture distribution for an area of 30×30 pixels, covered with a frontplane. The pixel size is 300×300 μm²; active pixel size, 270×270 μm²; cell size 145×145 μm². The backplane pixel thus has a slightly larger area than four frontplane cells. Four frontplane cells of this display fit into one frontplane cell of the display in FIGS. 3*a* and *b*. The cells have straight walls of 20 μm thickness, at a mismatch angle of 0°. The division between iso-aperture lines is also 0.01.

FIGS. 7*a* and *b* show an aperture distribution for an area of 30×30 pixels, covered with a frontplane. The pixel size is 300×300 μm²; active pixel size, 270×270 μm²; cell size, 145×145 μm². The backplane pixel thus has a slightly larger area than four frontplane cells. Four frontplane cells of this display fit into one frontplane cell of the display in FIGS. 4*a* and *b*. The walls are sinusoidally curved with an amplitude of 30 μm and have a 20 μm thickness. The mismatch angle is 0°. The division between iso-aperture lines is 0.01.

The Table below summarizes the maximum and minimum aperture and the relative width of the distribution of aperture for the five geometries of FIGS. 3-7.

TABLE

| Geometry | Maximum Aperture | Minimum Aperture | Relative Width |
|---|---|---|---|
| 1. Cell 290 μm; straight; angle 0° (FIG. 3a, b) | 0.780 | 0.694 | 11.7% |
| 2. Cell 290 μm; curved; angle 0° (FIG. 4a, b) | 0.683 | 0.654 | 4.3% |
| 3. Cell 290 μm; straight; angle 45° (FIG. 5a, b) | 0.729 | 0.648 | 11.8% |
| 4. Cell 145 μm; straight; angle 0° (FIG. 6a, b) | 0.695 | 0.588 | 16.7% |
| 5. Cell 145 μm; curved; angle 0° (FIG. 7a, b) | 0.562 | 0.518 | 8.1% |

The relative width in the Table is: $2 \times (Max_{aperture} - Min_{aperture})/(Max_{aperture} + Min_{aperture}) \times 100\%$.

As can be seen from the above, the relative width of the aperture distribution is much lower for geometry 1 (straight walls) than for geometry 2 (curved walls).

Geometry 3 (straight walls) shows that changing the mismatch angle between the front- and backplane does change the distribution pattern, but not the relative width of the aperture distribution.

The effect of introducing curved walls is not dependent on the ratio of the pixel size and the cell size, as can be seen by comparing geometry 4 (straight walls) and geometry 5 (curved walls). The present invention may be used advantageously to reduce moiré effects in a display in which wall thickness has already been minimized and active pixel area maximized to the extent practicable for that display design.

Finally, the above-discussion is intended to be merely illustrative of the present invention and should not be construed as limiting the appended claims to any particular embodiment or group of embodiments. Thus, while the present invention has been described in particular detail with reference to specific exemplary embodiments thereof, it should also be appreciated that numerous modifications and changes may be made thereto without departing from the broader and intended spirit and scope of the invention as set forth in the claims that follow. The specification and drawings are accordingly to be regarded in an illustrative manner and are not intended to limit the scope of the appended claims.

In interpreting the appended claims, it should be understood that:
 a) the word "comprising" does not exclude the presence of other elements or acts than those listed in a given claim;
 b) the word "a" or "an" preceding an element does not exclude the presence of a plurality of such elements;
 c) any reference numerals in the claims are for illustration purposes only and do not limit their protective scope;
 d) several "means" may be represented by the same item or hardware or software implemented structure or function; and
 e) each of the disclosed elements may be comprised of hardware portions (e.g., discrete electronic circuitry), software portions (e.g., computer programming), or any combination thereof.

The invention claimed is:
1. A display comprising:
 a backplane having an array of electronic pixels, two or more electronic pixels of the array of electronic pixels each having an active pixel area and a total pixel area; and
 a frontplane comprising an array of electro-optic elements, the frontplane being fixed to the backplane, the active pixel areas of at least two of the two or more electronic pixels in the backplane being opposite respective inner cell areas of a corresponding at least two of the two or more electro-optic elements and forming at least respective first and second display elements of the display, the first and second display elements each having an aperture, and the aperture of the first display element having a predetermined value different from the aperture of the second display element, wherein one or more of the electronic pixels has all curved edges or all jagged edges.

2. The display of claim 1, wherein the predetermined value of the aperture is the total inner cell area of the respective first or second display element divided by the total pixel area of that respective first or second display element.

3. The display of claim 1, wherein a relative width of distribution of aperture is determined as a percentage equal to:

$$2\times100\times(Max_{aperture}-Min_{aperture})/(Max_{aperture}+Min_{aperture})$$

where $Max_{aperture}$ is a maximum aperture of a pixel of the display and $Min_{aperture}$ is a minimum aperture of a pixel of the display; and the display has a predetermined relative width of distribution of aperture.

4. The display of claim 1, wherein an electro-optic element comprises one or more electro-optic cells having one or more curved walls.

5. The display of claim 4, wherein one of the one or more curved walls is curved sinusoidally.

6. The display of claim 1, wherein an electro-optic element comprises one or more electro-optic cells having jagged edges.

7. The display of claim 6, wherein one or more of the one or more electro-optic cells has formed in a saw tooth pattern.

8. The display of claim 1, wherein one or more of the electronic pixels has all edges curved sinusoidally.

9. The display of claim 1, wherein one or more of the electronic pixels has all edges formed in a saw tooth pattern.

10. A method of manufacture of a display comprising:
providing a backplane having an array of electronic pixels; and
determining a desired geometry for a frontplane having an array of opto-electronic pixel elements, the desired geometry having a reduced aperture with respect to a value of aperture in a display in which cells of the opto-electronic pixel elements are rectangular in shape and substantially symmetrical with cells of the electronic pixels,
wherein one or more of the electronic pixels has all curved edges or all jagged edges.

11. The method of claim 10 comprising laminating the backplane to a frontplane with the desired geometry.

12. The method of claim 10 wherein an opto-electronic pixel element in a frontplane of the desired geometry comprises one or more opto-electronic cells with curved walls.

13. The method of claim 12, wherein one or more walls of the opto-electronic cell with curved walls is curved sinusoidally.

14. The method of claim 10 wherein an opto-electronic pixel element in a frontplane of the desired geometry comprises one or more opto-electronic cells with walls extending in a jagged pattern.

15. The method of claim 14 wherein one or more of the one or more opto-electronic cells with walls extending in a jagged pattern, has walls which extend in a saw tooth pattern.

16. A method of designing a display screen comprising:
determining a variation in aperture of pixels of two or more possible pixel arrays for the display screen; and
choosing for the display screen a one of the two or more possible pixel arrays, the one of the two or more possible pixel arrays chosen having a relative width of aperture less than a second of the two or more possible pixel arrays,
wherein one or more of the pixels has all curved edges or all jagged edges.

17. The method of claim 16, wherein a pixel of the display screen comprises an electronic pixel and an opto-electronic pixel element laminated together, the aperture of the pixel being a total inner pixel area of the opto-electronic pixel element opposite an active pixel area of the electronic pixel divided by a total pixel area of the electronic pixel element and the relative width of aperture being calculated as a percentage equal to:

$$2\times100\times(Max_{aperture}-Min_{aperture})/(Max_{aperture}+Min_{aperture})$$

where $Max_{aperture}$ is the maximum aperture of a pixel of the display and $Min_{aperture}$ is the minimum aperture of a pixel of the display.

* * * * *